United States Patent
Weston et al.

(10) Patent No.: US 11,587,081 B2
(45) Date of Patent: *Feb. 21, 2023

(54) CONDUCTING FUEL DISPENSING TRANSACTIONS

(71) Applicant: Wayne Fueling Systems LLC, Austin, TX (US)

(72) Inventors: Timothy Martin Weston, Cedar Park, TX (US); Weiming Tang, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 1640 days.

This patent is subject to a terminal disclaimer.

(21) Appl. No.: 14/790,109

(22) Filed: Jul. 2, 2015

(65) Prior Publication Data

US 2015/0302408 A1 Oct. 22, 2015

Related U.S. Application Data

(63) Continuation of application No. 11/862,663, filed on Sep. 27, 2007, now Pat. No. 9,087,427.

(51) Int. Cl.
*G06Q 20/40* (2012.01)
*G06Q 20/20* (2012.01)
*G06Q 20/38* (2012.01)
*G06Q 30/06* (2023.01)
(Continued)

(52) U.S. Cl.
CPC .......... *G06Q 20/401* (2013.01); *G06Q 20/18* (2013.01); *G06Q 20/20* (2013.01); *G06Q 20/382* (2013.01); *G06Q 20/3823* (2013.01); *G06Q 30/06* (2013.01); *G07F 13/025* (2013.01)

(58) Field of Classification Search
CPC .... G06Q 20/20; G06Q 20/202; G06Q 20/204; G06Q 20/206
See application file for complete search history.

(56) References Cited

U.S. PATENT DOCUMENTS

| | | |
|---|---|---|
| 5,412,586 A | 5/1995 | Oldfather |
| 5,448,638 A | 9/1995 | Johnson et al. |
| 5,493,613 A | 2/1996 | Denno et al. |

(Continued)

*Primary Examiner* — Jay Huang
(74) *Attorney, Agent, or Firm* — Mintz Levin Cohn Ferris Glovsky and Popeo, PC

(57) ABSTRACT

Fuel dispensing transactions may be accomplished by a variety of systems and techniques. A fuel dispensing device may include a payment module, a data entry device, and a customer display. The payment module may receive a first communication from a point of sale device requesting an encrypted response and receive a second communication from the point of sale device requesting an unencrypted response. The module may match the first communication to a first corresponding library entry, match the second communication to a second corresponding library entry, determine a user response based on one of the first corresponding library entry or the second corresponding library entry, where the user response defines one of the encrypted response based on the first corresponding library entry or the unencrypted response based on the second corresponding library entry, and use the corresponding library entry to generate a visual customer display requesting the user response.

22 Claims, 4 Drawing Sheets

(51) Int. Cl.
*G07F 13/02* (2006.01)
*G06Q 20/18* (2012.01)

(56) References Cited

U.S. PATENT DOCUMENTS

| | | | |
|---|---|---|---|
| 5,509,075 A | 4/1996 | Grube et al. | |
| 5,940,511 A | 8/1999 | Wilfong | |
| 6,185,307 B1* | 2/2001 | Johnson, Jr. | G06Q 20/04 |
| | | | 705/79 |
| 6,308,887 B1 | 10/2001 | Korman et al. | |
| 6,317,834 B1 | 11/2001 | Gennaro et al. | |
| 6,360,138 B1 | 3/2002 | Coppola et al. | |
| 6,522,947 B1* | 2/2003 | Hartsell, Jr. | G06Q 20/18 |
| | | | 700/282 |
| 6,748,367 B1 | 6/2004 | Lee | |
| 7,039,389 B2 | 5/2006 | Johnson, Jr. | G06Q 20/20 |
| | | | 455/406 |
| 7,047,223 B2 | 5/2006 | Watlington | |
| 7,096,490 B2 | 8/2006 | Xiong et al. | |
| 7,398,219 B1* | 7/2008 | Wolfe | G06Q 40/08 |
| | | | 707/999.003 |
| 7,454,623 B2* | 11/2008 | Hardt | H04L 63/20 |
| | | | 713/184 |
| 7,512,236 B1 | 3/2009 | Zhu | |
| 9,087,427 B2 | 7/2015 | Weston et al. | |
| 2002/0087479 A1 | 7/2002 | Malcolm | |
| 2002/0147705 A1* | 10/2002 | Bera | G06F 16/90344 |
| 2003/0025600 A1* | 2/2003 | Blanchard | G06Q 20/04 |
| | | | 705/64 |
| 2003/0046226 A1 | 3/2003 | Iue et al. | |
| 2003/0229793 A1 | 12/2003 | McCall et al. | |
| 2004/0010711 A1* | 1/2004 | Tang | G07F 13/025 |
| | | | 713/170 |
| 2004/0243517 A1* | 12/2004 | Hansen | G06Q 20/322 |
| | | | 705/64 |
| 2005/0147250 A1 | 7/2005 | Tang | |
| 2005/0177522 A1 | 8/2005 | Williams | |
| 2005/0262357 A1 | 11/2005 | Araujo et al. | |
| 2006/0036871 A1 | 2/2006 | Champine et al. | |
| 2006/0179323 A1 | 8/2006 | Nei | |
| 2006/0265736 A1 | 11/2006 | Robertson et al. | |
| 2006/0265740 A1 | 11/2006 | Clark et al. | |
| 2007/0033398 A1* | 2/2007 | Robertson | G07F 7/1075 |
| | | | 713/168 |
| 2007/0119859 A1* | 5/2007 | Harrell | G07F 9/026 |
| | | | 222/23 |
| 2008/0189592 A1* | 8/2008 | Lee | G06F 40/157 |
| | | | 715/204 |
| 2008/0202889 A1 | 8/2008 | Breitenbach et al. | |

* cited by examiner

CONDUCTING FUEL DISPENSING TRANSACTIONS

The present application claims priority to U.S. patent application Ser. No. 11/862,663 filed on Sep. 27, 2007, now U.S. Pat. No. 9,087,427, which is hereby incorporated by reference in its entirety.

TECHNICAL FIELD

This disclosure relates to fuel dispensers, and more particularly, to software, systems, and techniques for conducting fuel dispenser transactions.

BACKGROUND

The retail petroleum industry utilizes various types of fuel dispensers for dispensing fuel to customers. Often, security of the fuel dispensers is a concern for dispenser manufacturers, retail fuel providers, and customers alike. Security can encompass many different aspects of the fuel dispenser. For example, retail fuel providers may be concerned with the physical security of the fuel dispenser. Damage to or theft of the fuel dispenser may represent a large, unforeseen cost to the provider, and further, may reduce its business revenue due to customer skepticism of the overall security of the provider's property. Fuel dispenser manufacturers may be concerned with the security of proprietary equipment, devices, or software encompassed within the fuel dispenser. For instance, manufacturers may not be able to guarantee the security of information stored within or transmitted through the fuel dispenser should the proprietary equipment or software be compromised in any way. Any loss of proprietary or confidential equipment or software may severely limit the fuel dispenser manufacturer's ability to expand its business or obtain any regulatory approvals required for fuel dispensers. Customers may be concerned with several fuel dispenser security issues. For example, customers may be concerned with a possible loss of personal information, such as credit or debit card numbers, personal identification numbers (PIN), or other personal information. Customers may also he concerned that they are correctly charged for the amount of fuel or other retail services which they purchase at the fuel dispenser.

Based, at least in part, on these concerns, fuel dispensers may often include devices, hardware, and/or software, which help alleviate or prevent altogether the causes of these concerns. Solutions may include an upgrade to the physical structure of the fuel dispenser, such that it is less likely to become damaged or stolen. Furthermore, the fuel dispenser may periodically receive upgrades to one or more portions of software, hardware, and/or firmware residing on the fuel dispenser, which may increase the security of any proprietary or personal information stored within or transmitted through the fuel dispenser. In some instances, however, an upgrade to one or more components of the fuel dispenser, such as software, hardware, or firmware, may impact other components of a fuel dispensing retail environment, such as, a retail point-of-sale (POS) device or system.

SUMMARY

This disclosure relates to fuel dispensers, and more particularly, to software, systems, and techniques for conducting fuel dispenser transactions.

In one general aspect, software for conducting a fuel dispensing transaction may receive a first communication at a payment module from a point of sale device requesting an encrypted response; receive a second communication at the payment module from the point of sale device requesting an unencrypted response; match the first communication to a first corresponding library entry in the payment module; match the second communication to a second corresponding library entry in the payment module; determine a user response based on one of the first corresponding library entry or the second corresponding library entry, where the user response defines one of an encrypted response based on the first corresponding library entry or an unencrypted response based on the second corresponding library entry; use the corresponding library entry to generate a visual customer display requesting the user response; and transmit the user response to the point of sale device from the payment module.

In more specific aspects, the software may receive the user response at the payment module from a data entry device. The data entry device may be at least one of a keypad, a card reader, and a barcode scanner. In some specific aspects, the user response may correspond to a first input at the keypad defined by a first row location and a first column location, and the software may translate the first input to a second input at a point of sale keypad location defined by a second row location and a second column location, where at least one of the second row location and second column location may be different from the first row location and second column location. The second input may be identical to the first input. The software may also enable a secure mode of the keypad based on the first corresponding library entry and display a symbolic representation of the encrypted response during an entry of the user response in the secure mode.

In some particular aspects, the software may receive a third communication at the payment module from the point of sale device, where the third communication may define a pass-through command and use the third communication to generate a visual customer display of the pass-through command. The pass-through command may include at least one of an error message, a greeting message, an information message, and a product solicitation. Further, the encrypted response may include at least one of a personal identification number (PIN), a driver identification code, a payment card number, a payment card expiration date, a zip code of a payment card billing address, and a card verification code. The unencrypted response may include at least one of a zip code of a payment card billing address, an odometer value, and a customer loyalty number.

In certain aspects of the software, the first communication may include a first text to be displayed as the visual customer display and the second communication may include a second text to be displayed as the visual customer display. The software may match the first text to be displayed as the visual customer display to text in the first corresponding library entry and may match the second text to be displayed as the visual customer display to text in the second corresponding library entry. Further, the first communication may include a first reference code associated with text to be displayed as the visual customer display and the second communication may include a second reference code associated with text to be displayed as the visual customer display. The software may match the first reference code associated with text to be displayed as the visual customer display to a reference code in the first corresponding library entry and may match the second reference code associated with text to be displayed as the visual customer display to a reference code in the second corresponding library entry.

In another general aspect, a fuel dispensing device may include a payment module, a data entry device, and a customer display. The payment module may receive a first communication from a point of sale device requesting an encrypted response; receive a second communication from the point of sale device requesting an unencrypted response; match the first communication to a first corresponding library entry; match the second communication to a second corresponding library entry; determine a user response based on one of the first corresponding library entry or the second corresponding library entry, where the user response defines one of the encrypted response based on the first corresponding library entry or the unencrypted response based on the second corresponding library entry; use the corresponding library entry to generate a visual customer display requesting the user response; and transmit the user response to the point of sale device from the payment module, where the user response includes one of the encrypted response and the unencrypted response. The data entry device may receive the user response from a fuel dispenser customer. The customer display may visually display at least one of the first corresponding library entry, the second corresponding library entry, and the user response to the fuel dispenser customer.

Various implementations may include one or more features. For example, software or systems for conducting a fuel dispensing transaction may allow a security upgrade to a fuel dispenser without requiring a corresponding upgrade to a retail POS device or system. As another example, software or systems for conducting a fuel dispensing transaction may allow specific communications from an upgraded fuel dispenser to appear transparent to an existing retail POS device or system. As yet another example, software or systems for conducting a fuel dispensing transaction may help to prevent fraud and/or a theft of a fuel dispenser customer's personal and financial information. As another example, software or systems for conducting a fuel dispensing transaction may allow for greater security protection of confidential or personal information without requiring new or additional fuel dispenser hardware.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Ensuring the security and clarity of communications between a fuel dispenser and a retail POS device or system is one aspect of the fuel dispenser hardware and software. Particularly, a fuel dispenser payment module may include software that, in whole or in part, ensures the security of communications between the fuel dispenser and the retail POS. While increased security made possible by software executed by the payment module allows for greater protection of a fuel dispenser customer's personal and/or financial information, the software must still allow for seamless communication between the fuel dispenser and the retail POS. Fuel dispenser software, the use of which may require a hardware and/or software upgrade to the retail POS in order to achieve the seamless communication, may not be feasibly deployed within the fuel dispenser due to, for example, the expense in upgrading the retail POS. A failure to deploy the fuel dispenser software, however, may result in decreased security of the customer's personal and/or financial information. Payment module software that allows for backward compatibility with an existing retail POS device or system provides for increased security of sensitive data, e.g., customer personal and/or financial information, and seamless communications between the payment module and the existing retail POS. For example, software that allows for backward compatibility with the existing retail POS may match a communication from the POS requesting a customer response to a corresponding library entry stored on the payment module and display the corresponding library entry (rather than the communication from the POS) to the customer for the response.

Figure 1:
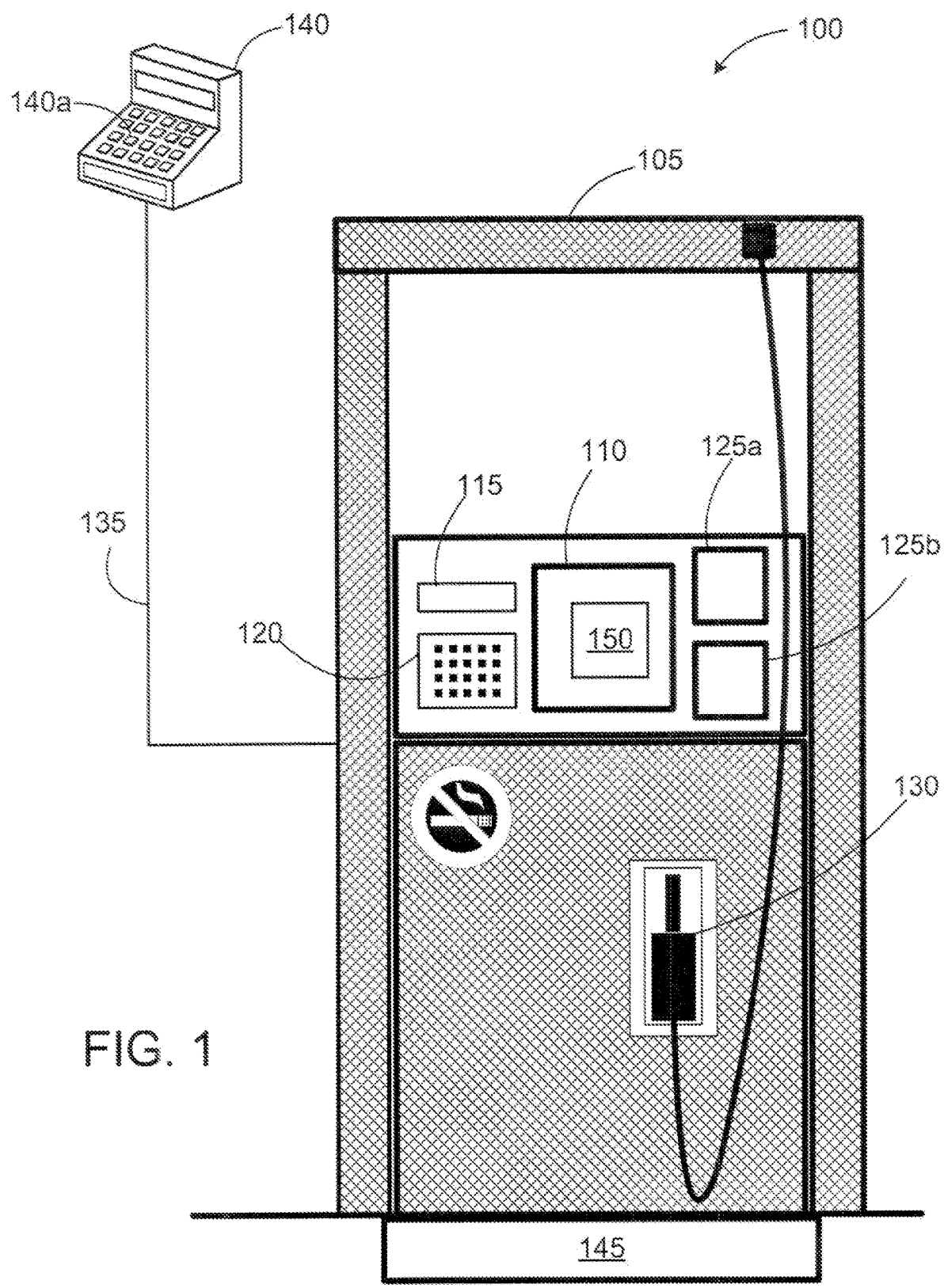
FIG. 1 illustrates a fuel dispensing environment that may conduct fuel dispensing transactions according to the present disclosure.

FIG. 1 illustrates a fuel dispensing system 100 that may allow for backward compatibility between a fuel dispenser and a retail POS device or system. Fuel dispensing system 100 includes a fuel dispenser 105, a POS terminal 140, a communication link 135, and a pumping mechanism 145. Generally, system 100 allows for the supply, payment, and monitor of one or more types of fuel in a retail or commercial fuel dispensing environment, while simultaneously allowing for backward compatibility between the fuel dispenser 105 and the POS terminal 140.

Fuel dispenser 105 includes a payment module 110, a customer display 115, a fuel dispenser keypad 120, fuel dispenser components 125a and 125b, and a nozzle 130. Generally, fuel dispenser 105 allows for a retail consumer or commercial purchaser to dispense fuel, e.g., unleaded gasoline, diesel, ethanol, or natural gas, into a private or public vehicle, and, in some aspects, allows for the payment of the fuel and generation of a receipt to the consumer. Fuel dispenser 105 may also, in some aspects, allow for directed advertising to the consumer for the cross-marketing of other products generally provided at a retail fueling environment, such as system 100. For example, fuel dispenser 105 may allow a retail consumer to purchase cross-marketed products, such as a car wash or food and drink products, and, in certain aspects, the fuel dispenser 105 may function as an automated teller machine (ATM).

Fuel dispenser 105 includes payment module 110. In some aspects, payment module 110 may be a secure payment module, which provides for secure or encrypted communications between fuel dispenser 105 and POS terminal 140, as well as other systems or devices. Further, payment module 110 may provide for unencrypted communications between fuel dispenser 105 and POS terminal 140. Payment module 110 is shown integral to fuel dispenser 105 and includes compatibility module 150. Generally, payment module 110 fits within an enclosure of fuel dispenser 105 and is secured within fuel dispenser 105. In particular aspects, the payment module 110 may be mounted on a locked, hinged access door of the fuel dispenser 105, such that access to the payment module 110 may be achieved by unlocking and opening the door. Further, payment module 110 may reside in a tamper-resistant and/or tamper-sensitive enclosure for storing sensitive data, such as, for example, cryptographical data relevant to providing secure communications among and between the components of system 100. The secure communications, generally, include sensitive data, such as customer financial and personal information, to be transmitted to the POS terminal 140 or a payment verification system (e.g., a credit or debit card provider network or a financial institution network). Customer financial or personal information may include, for example, a personal identification number (PIN), a driver identification code, a payment card number (e.g., credit or debit card account number), a payment card expiration date, a zip code of a payment card billing address, and a card verification code.

Continuing with FIG. 1, payment module 110 includes a combination of hardware, firmware, and/or software which facilitates communication between one or more additional components of fuel dispenser 105, POS terminal 140, and other systems, networks or devices. For example, payment module 110 may be one or more printed circuit boards or printed circuit board assemblies containing one or more processors (e.g., microprocessors) and one or more memory modules.

The processor executes instructions and manipulates data to perform the operations of the payment module 110. In certain embodiments, the processor executes the compatibility module 150. Compatibility module 150, generally, is software that provides for seamless or transparent communication between the existing POS terminal 140 and the fueling dispenser 105 through payment module 110 even though payment module 110 may be an upgraded payment module 110 installed in fuel dispenser 105 for the purpose of, for example, increased data security. As used herein, software generally includes any appropriate combination of software, firmware, hardware, and/or other logic. For example, compatibility module 150 may be written or described in any appropriate computer language including, for example, C, C++, Java, Visual Basic, assembler, Perl, ABAP, any suitable version of 4GL, or any combination thereof. It will be understood that while compatibility module 150 is illustrated in FIG. 1 as a single multi-tasked module, the features and functionality performed by this engine may be performed by multiple modules. Further, while illustrated as internal to payment module 110, one or more processes associated with the compatibility module 150 may be stored, referenced, or executed remotely. Moreover, compatibility module 150 may be a child or sub-module of another software module (such as a software module operable to, for example, encrypt and/or decrypt data) without departing from the scope of this disclosure.

Compatibility module 150 may be executed upon receipt of a communication at the payment module 110 from the POS terminal 140. In some instances, the communication may take the form of a request for a customer response. For example, in order to advance a fuel dispensing transaction, POS terminal 140 may request that the customer provide a PIN for a debit card. The communication from the POS terminal 140 is matched to a corresponding entry in a library stored on the payment module and accessed by compatibility module 150 in order to, for example, ensure that the request is a legitimate request from the POS terminal and not an attempt to gain unauthorized access to the customer's PIN. The library may contain one or more entries corresponding to various communications from the POS terminal 140. The compatibility module 150 may further determine an appropriate customer response based on the matched library entry. For example, the appropriate customer response to the request for the PIN may be an encrypted response, such that the payment module 110 secures or encodes the customer's response prior to transmission to the POS terminal 140. In order to obtain the customer response, the compatibility module 150 provides a visual display to the customer requesting the PIN. Once the customer provides the requested PIN as the customer response, the response may be transmitted to the POS terminal 140.

In some instances, the POS terminal 140 requests a customer response that may be an unencrypted response. For example, some customer data may be transmitted from the fuel dispenser 105 to the POS terminal 140 in an unencrypted or clear-text form. This data may include data such as a zip code of a payment card billing address, an affirmative response (i.e., "yes"), a negative response (i.e., "no"), a vehicle odometer value, and a customer loyalty number (e.g., an assigned number that allows the retail merchant to reward a frequent customer with, for example, discounts, promotions, or cross-marketing benefits).

The POS terminal 140 may also transmit a communication to the fuel dispenser 105 that does not request a customer response. In some aspects, this communication may be a pass-through command, such that compatibility module 150 relays the command to the customer without matching the command to an entry in the library. The pass-through command may be, for example, an error message, a greeting message, an information message, or a product solicitation. In some embodiments, the payment module 110 may allow a single-digit key press by the customer in response to certain pass-through commands. As one example, a pass-through command may offer the customer a vehicle wash option. In response to the offer, the customer may respond with a "yes" or "no" to the offer. After the single-digit key press (e.g., "yes", "no", "1", "2", etc.), the payment module 110 may lock the dispenser keypad 120 to prohibit additional keypad entries by the customer.

The memory of the payment module 110 may take the form of volatile or non-volatile memory including, without limitation, magnetic media, optical media, random access memory (RAM), read-only memory (ROM), removable media, or any other suitable local or remote memory component. For example, compatibility module 150 may be stored and accessed from the memory along with, for instance, other applications, backup data, or other information that includes any cryptographical data, parameters, variables, algorithms, instructions, rules, or references thereto. The memory may also include any other appropriate data for proper operation of the processor and the payment module 110 in general, including one or more libraries accessed by compatibility module 150. In some aspects, compatibility module may be stored on memory external to payment module 110 yet accessed and executed by the one or more processors in the payment module 110.

Continuing with FIG. 1, fuel dispenser 105 also includes customer display 115. Generally, customer display 115 is communicably coupled to payment module 110 and provides for a visual display of, for example, data, information, requests for response, and commands to the fuel dispensing customer. Customer display 115 may be a liquid crystal display (LCD) capable of displaying alphanumeric characters in any format, such as a periodic display or rolling display, and in various languages. In certain implementations, customer display 115 may display requests for responses, commands, or other data and information in one of several languages depending on a selection made by the customer at the fuel dispenser 105. Although illustrated as separate from payment module 110 in FIG. 1, in some aspects, customer display 115 may be integral with payment module 110 and, for instance, may be contained in the same housing or enclosure as the payment module 110. Customer display 115 may also, in certain implementations, be included in fuel dispenser 105 as one of fuel dispenser components 125a or 125b.

Fuel dispenser 105 also includes dispenser keypad 120. Typically, dispenser keypad 120 allows for the fuel dispensing customer to enter alphanumeric or other information, data, and responses to be utilized by, at least, payment module 110, compatibility module 150, customer display 115, and POS terminal 140. Dispenser keypad 120 is communicably coupled to payment module 110 and, in some aspects, includes multiple buttons or soft keys representing numerals 0 through 9, as well as other functionality. For example, dispenser keypad 120 may be configured in a grid-like pattern of rows and columns with distinct keys having specific row and column assignments. Numeral "1" may, in some aspects, be assigned row 1, column 1, while numeral "2" may be assigned row 1, column 2, and so on. However, several different implementations of the dispenser keypad 120 are contemplated. In some implementations, a function key (e.g., an "enter" or "cancel" function) may be assigned row 1, column 1 while numeral "1" is assigned row 1, column 2. Regardless, this disclosure contemplates that dispenser keypad 120 may include any appropriate design or assignment of keys.

Fuel dispenser components 125a and 125b are also integral to fuel dispenser 105 and are representative of fuel dispenser components typically found in a retail fuel dispenser, such as fuel dispenser 105. Although two fuel dispenser components 125a and 125b are illustrated as integral to fuel dispenser 105, fewer or greater fuel dispenser components may be included in fuel dispenser 105, as appropriate. Fuel dispenser components 125a and 125b may include, for example, a card reader (e.g., a magnetic card reader, a smart card or integrated circuit card (ICC) reader, or a Radio Frequency Identification (RFID) card reader), a customer display, a keypad, a barcode scanner, a receipt printer, a soft key module, a biometric device, a cash receptor; a pulser (i.e., a fuel meter), or other common retail fueling environment component. Fuel dispenser components 125a and 125b may be directly connected to payment module 110 within fuel dispenser 105 by a variety of communication devices and techniques, such as, for example, an RS-485 serial connection, an Ethernet connection, or other suitable connection. In particular aspects, one or another of the fuel dispensing components 125a and 125b may be a dispenser keypad, such as the dispenser keypad 120. Moreover, one or another of the fuel dispensing components 125a and 125h may be a customer display, such as the customer display 115.

Nozzle 130 is utilized for dispensing fuel, stored in under- or above-ground storage facilities, to the consumer's vehicle or portable fuel enclosure. Generally, nozzle 130 is connected through a flexible conduit to a pumping mechanism 145, which pumps the consumer-chosen fuel from the storage facility through the nozzle 130 upon activation of the nozzle 130. One nozzle 130 is illustrated as integral to fuel dispenser 105, as shown in FIG. 1; however, fuel dispenser 105 may have multiple nozzles 130, each of which may dispense one or more distinct fuel types.

Continuing with FIG. 1, the fuel dispensing system 100 also includes POS terminal 140. Generally, POS terminal 140 may be any device which monitors one or more fuel dispensers 105 and acts to, for example, authorize fueling transactions. The POS terminal 140, in some aspects, may be the main controller (or computer) that controls and coordinates the activities of system 100. In some embodiments, more than one POS terminal 140 may be present within the system 100. Generally, POS terminal 140 includes memory, as well as one or more processors, and comprises an electronic computing device operable to receive, transmit, process, store, or manage data associated with the system 100. Generally, this disclosure provides merely one example of computers that may be used with the disclosure. As used in this document, the term "computer" is intended to encompass any suitable processing device. For example, POS terminal 140 may be implemented using computers other than servers, as well as a server pool. Indeed, POS terminal 140 may be adapted to execute any operating system including Linux, UNIX, Windows Server, or any other suitable operating system. According to one embodiment, POS terminal 140 may also include or be communicably coupled with a web server and/or a mail server.

POS terminal 140 includes terminal keypad 140a. Terminal keypad 140a, generally, allows for the input of alphanumeric data into POS terminal 140 to be, for example, stored in memory, transmitted to fuel dispenser 105, or other appropriate location. Terminal keypad 140a is communicably coupled to POS terminal 140 through a wired or wireless connection. In some aspects, terminal keypad 140a may be integral to POS terminal 140. Terminal keypad 140a, in some implementations, may include several buttons or soft keys configured into a grid-like pattern. Certain keys of terminal keypad 140a may be assigned particular alphanumeric characters, as well as particular functions. For example, terminal keypad 140a may include 4 rows and 5 columns, or in other words, 20 total keys. Numeric characters 0-9 may be programmed at keys located in rows 1 through 4 and columns 2 through 4. In some aspects, numeric characters 0-9 may be programmed at keys located in rows 1 through 4 and columns 1 through 3. Regardless, this disclosure contemplates that terminal keypad 140a may include any appropriate design or assignment of keys.

Fuel dispenser 105 communicates to POS terminal 140 through communication link 135. Communication link 135, generally, allows for and facilitates the transmission of electronic data to and from the components of system 100. More specifically, communication link 135 may be any form of wired communication, such as an RS-485 (EIA-485) serial connection, an RS-232 serial connection, an Ethernet connection, a universal serial bus (USB) connection, all or a portion of a Local Area Network (LAN), a portion of a Wide Area Network (WAN), a modem or broadband connection, or a portion of the global network known as the Internet. Moreover, communication link 135 may, in some aspects, utilize wireless communication, such as, for example, IEEE 802.11, Bluetooth, WiMax, or other radio frequency (RF) or infra red (FR) format. Fuel dispenser 105 may also communicate through wired or wireless signals to other systems (not shown), such as credit or debit card payment system networks or other third party payment verification services.

Continuing with FIG. 1, system 100 includes pumping mechanism 145. Pumping mechanism 145 is coupled to fuel dispenser 105 and operates to pump a customer-chosen fuel from a fuel storage tank through nozzle 130 so that a retail customer may refuel a vehicle. Pumping mechanism 145, generally, is any type of positive displacement mechanism, including valves and fuel conduit, appropriate to a retail fueling environment. Although illustrated as physically coupled to fuel dispenser 105 in FIG. 1, pumping mechanism 145 may be located at the fuel storage tank and may operate through commands received from, for instance, the fuel dispenser 105 or the POS terminal 140, as appropriate. Pumping mechanism 145 may also be disabled by the payment module 110 or POS terminal 140 should an unauthorized action occur, such as, for example, an attempted theft of fuel or act of vandalism to the fuel dispenser 105. Upon disablement, pumping mechanism 145 may be prevented from pumping the customer-chosen fuel from the fuel storage tank through nozzle 130.

Figure 2:
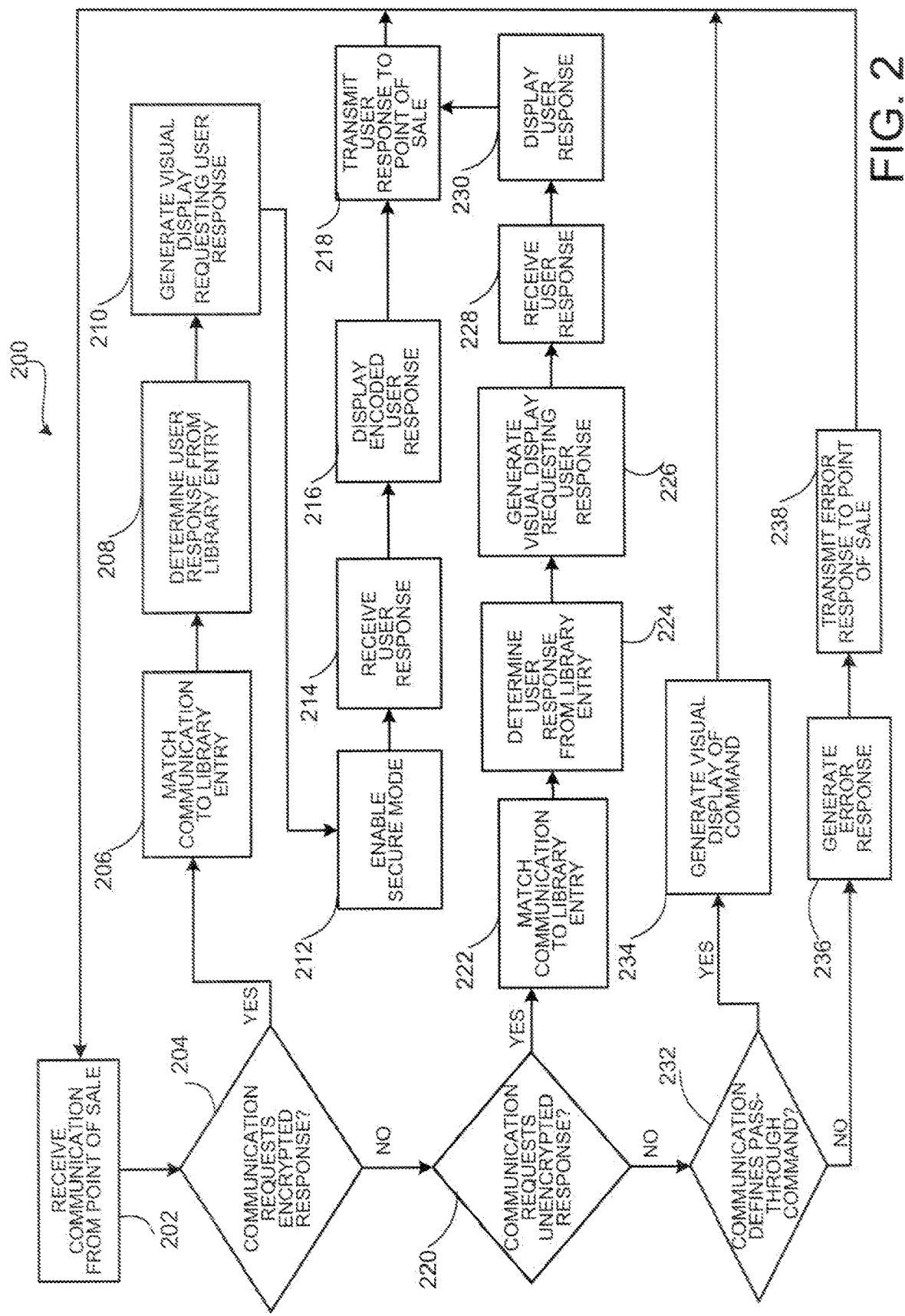
FIG. 2 is a flowchart illustrating one method of conducting fuel dispensing transactions between a fuel dispenser and an existing retail POS.

FIG. 2 illustrates a method 200 for conducting fuel dispenser transactions. Method 200 may be implemented by a system including a fuel dispenser and a POS terminal, which may be similar to those in fuel dispensing system 100. Method 200 may, for example, illustrate one mode of operation of fuel dispenser 105, including payment module 110 with compatibility module 150.

Method 200 begins with receipt of a communication at a fuel dispenser from a POS terminal [202]. The communication may be directed to, for example, a payment module integral to the fuel dispenser that includes a compatibility module. In some aspects, the compatibility module is a software routine or engine that acts upon, or otherwise directs or manages the communication as it is processed by the payment module. The compatibility module first determines if the communication requests an encrypted response from a fuel dispenser customer, such as confidential or sensitive personal or financial information that may be encrypted or secured for transmission, e.g., a personal identification number (PIN), a driver identification code, a payment card number, a payment card expiration date, a zip code of a payment card billing address, or a card verification code [204]. The encrypted response may be requested in order to, for instance, complete or otherwise proceed with a fuel dispensing transaction. If the communication requests an encrypted customer response, the communication is matched to a corresponding entry in a pre-defined mapping file, or library, stored on, for example, the payment module [206]. In some aspects, the pre-defined mapping file may be secured through a digital signature. A user response is next determined from the corresponding library entry [208]. Then, a visual display requesting the user response is generated to be displayed to the customer [210]. In some implementations, the visual display is provided to the customer on a customer display module of the fuel dispenser, which may be an LCD readout screen. A secure mode of the payment module is then enabled [212]. The payment module receives the user response from a fuel dispenser data entry device [214]. The data entry device may be a dispenser keypad, a card reader, or a barcode scanner, to name but a few. The entered user response is then preferably displayed in an encoded format on the customer display for the purpose of, for instance, indicating to the customer that a sufficient number of alphanumeric digits have been entered for the response [216]. In particular implementations, the encoded format of the user response may consist of a simple substitution of asterisks or other symbolic characters for alphanumeric text. The encoded format may, in some aspects, help deter the theft of customer personal or financial information through, for example, "shoulder surfing" by a thief or another customer. The user response is then transmitted from the fuel dispenser to the POS terminal [218].

Continuing with method 200, if the communication does not request an encrypted response [204], then the compatibility module determines if the communication requests an unencrypted response [220]. For example, the POS terminal may request that the fuel dispensing customer provide certain data that may not be secured or encrypted prior to transmission. In some aspects, the unencrypted response may include a zip code of a payment card billing address, an affirmative response, a negative response, an odometer value, or a customer loyalty number. The communication is then matched to a corresponding entry in the library [222]. The compatibility module determines a user response from the corresponding library entry [224] and generates a visual display requesting the user response for the fuel dispenser customer [226]. The user response is received by the payment module through the data entry device [228]. The user response is (optionally) displayed to the fuel dispenser customer [230] and transmitted to the POS terminal [218]. After transmission of the user response, whether it may be the encrypted or unencrypted response, the fuel dispenser awaits a next communication from the POS terminal [202].

If the communication also does not request an unencrypted response from the customer [220], the compatibility module determines if the communication defines a pass-through command [232]. In some aspects, the pass-through command is a communication from the POS terminal to the fuel dispenser that may not require a user response. For example, the pass-through command may include, among others, an error message, a greeting message, an information message, or a product solicitation. If the communication is a pass-through command, a visual display representing the pass-through command is generated and displayed to the customer [234]. The pass-through command may be displayed on a customer display included in the fuel dispenser. If the communication is not a pass-through command, the fuel dispenser generates an error response [236] and transmits the error response to the POS terminal [238]. In some aspects, the error response may inform the POS terminal that the communication was unrecognizable by the fuel dispenser and request an alternate communication.

FIG. 2 illustrates one method for conducting fuel dispenser transactions, however, other methods may have additional or fewer steps. Also, some steps in method 200 may be done in parallel to other steps. For instance, the payment module may receive the user response to the request for an encrypted response and display the encoded user response simultaneously or substantially simultaneously. As another example, the compatibility module may also determine whether the communication matches a corresponding library entry, and if no match is found, disable the payment module from receiving a user response through, for example, the dispenser keypad. As yet another example, the user response entered relative to either the communication requesting an encrypted response or the communication requesting an unencrypted response may be transmitted to a location in addition to or alternatively to the POS terminal. For example, the user response may be transmitted to a payment verification system (e.g., a credit or debit card provider network or a financial institution network).

Figure 3:
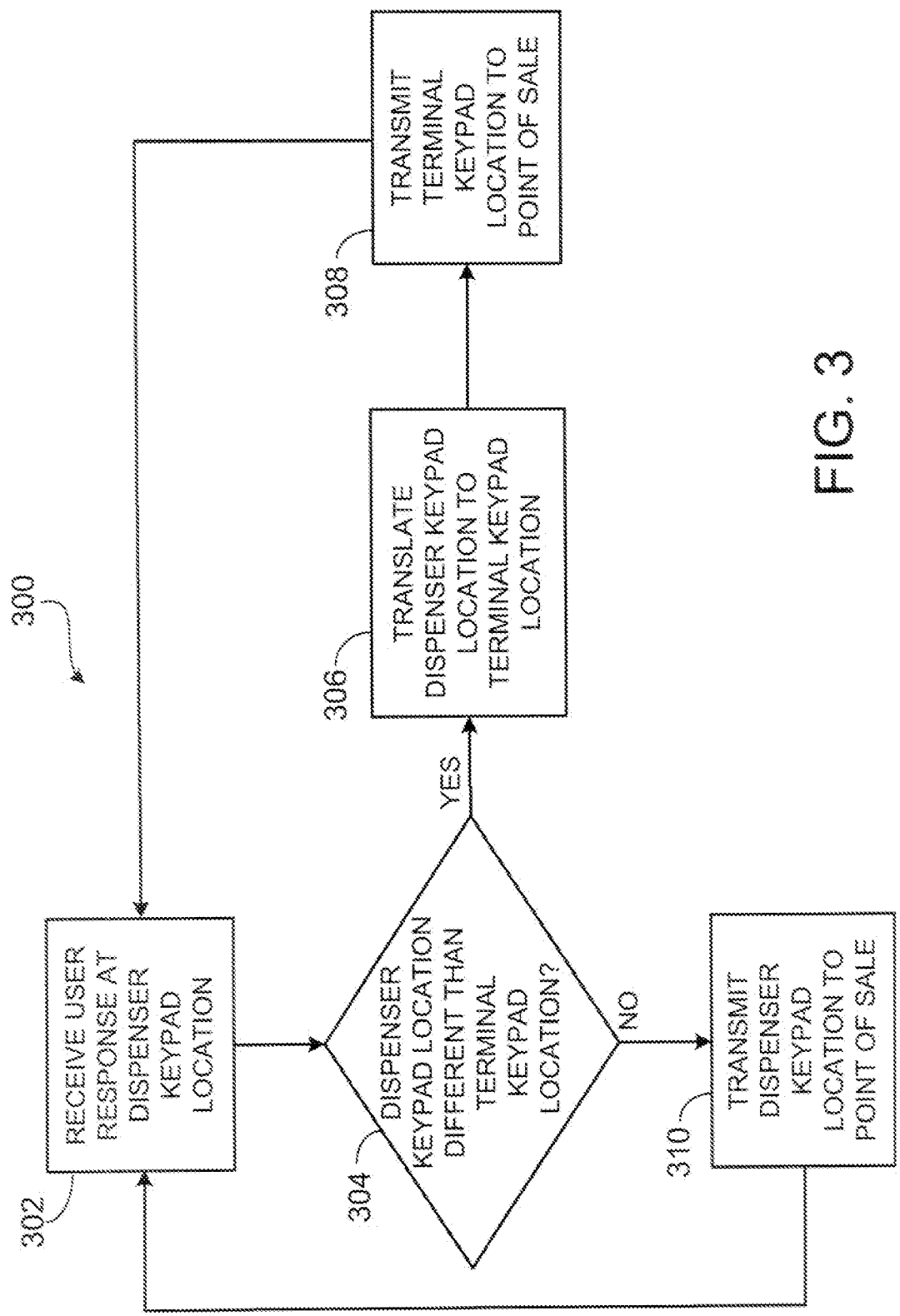
FIG. 3 is a flowchart illustrating one method of transparent communication between a fuel dispenser and an existing retail POS.

FIG. 3 illustrates one method 300 for conducting transparent or seamless fuel dispenser transactions between a fuel dispenser and a POS terminal. Method 300 may be implemented by a system including a fuel dispenser and a POS terminal, which may be similar to those in fuel dispensing system 100. Method 300 may, for example, illustrate one mode of operation of fuel dispenser 105, including payment module 110 with compatibility module 150, dispenser keypad 120, communication link 135, POS terminal 140, and terminal keypad 140a.

Method 300 begins when a user response is received at a dispenser keypad location [302]. For example, the dispenser keypad may be a grid-like configuration of buttons or soft-keys with each button or key assigned a particular numeric symbol and/or function. In some aspects, the dispenser keypad may include 20 keys configured into 4 rows and 5 columns. For purposes of illustration, it may be assumed that the user response is the numeral "1", which is programmed at row=1, column=1 (i.e., x=1, y=1) of the dispenser keypad. A compatibility module within a fuel dispenser payment module then determines if the dispenser keypad location of the user response, i.e., the numeral "1", is located at the same keypad location on a POS keypad [304]. In some aspects, the payment module may be pre-programmed with the configuration of the POS keypad's numeric keys (i.e., the "0" through "9" keys) in order for the compatibility module to determine if the dispenser keypad location of the user response is located at the same keypad location on a terminal keypad. For example, the configuration of the PUS keypad may be defined in an eXtensible Markup Language (XML) configuration that may be updated as appropriate. In some aspects, the XML configuration is updated remotely from the fuel dispenser through a wired or wireless communication link. The XML configuration may be, in certain implementations, updated locally through, for example, a USB key.

Further, in particular aspects, the payment module may learn the location of the terminal keypad's function keys (e.g., "enter," "cancel," "yes," etc.) through communication with the POS terminal. For instance, the POS terminal may transmit the terminal keypad configuration commands and keypad definitions for non-numerical keys to the payment module through a communication link.

Continuing with method 300, if the dispenser keypad location for the user response is different than the terminal keypad location for the user response, the payment module translates the dispenser keypad location to the terminal keypad location through the compatibility module [306]. For example, returning to the above example, the user response may be the numeral "1" located at dispenser keypad location x=1, y=1. However, the terminal keypad location for the numeral "1" may be x=1, y=2. Thus, the POS terminal expects keypad location x=1, y=2 to be transmitted from the payment module for the numeral "1." The compatibility module translates the dispenser keypad location, x=1, y=1, to the terminal keypad location, x=1, y=2, using, for example, the XML configuration stored in the payment module. Once translated, the terminal keypad location corresponding to the user response is transmitted to the POS terminal [308]. If, however, the dispenser keypad location for the user response is identical to the terminal keypad location for the user response, the payment module transmits the dispenser keypad location to the POS terminal [310].

Although FIG. 3 illustrates one method for conducting transparent or seamless fuel dispenser transactions between a fuel dispenser and a POS terminal, other methods may have additional or fewer steps. Also, some steps in method 300 may be done in parallel to other steps. For instance, the payment module may receive and store multiple user responses prior to translating each dispenser keypad location corresponding to the stored user responses into terminal keypad locations for the user responses. As one example, the payment module may allow entry of a multiple digit customer PIN. Rather than translating each digit of the PIN and transmitting the corresponding terminal keypad locations after each digit's entry, the payment module may store the digits until PIN entry is complete and then transmit the corresponding terminal keypad locations all at once (serially or in parallel) to the POS terminal.

Figure 4:
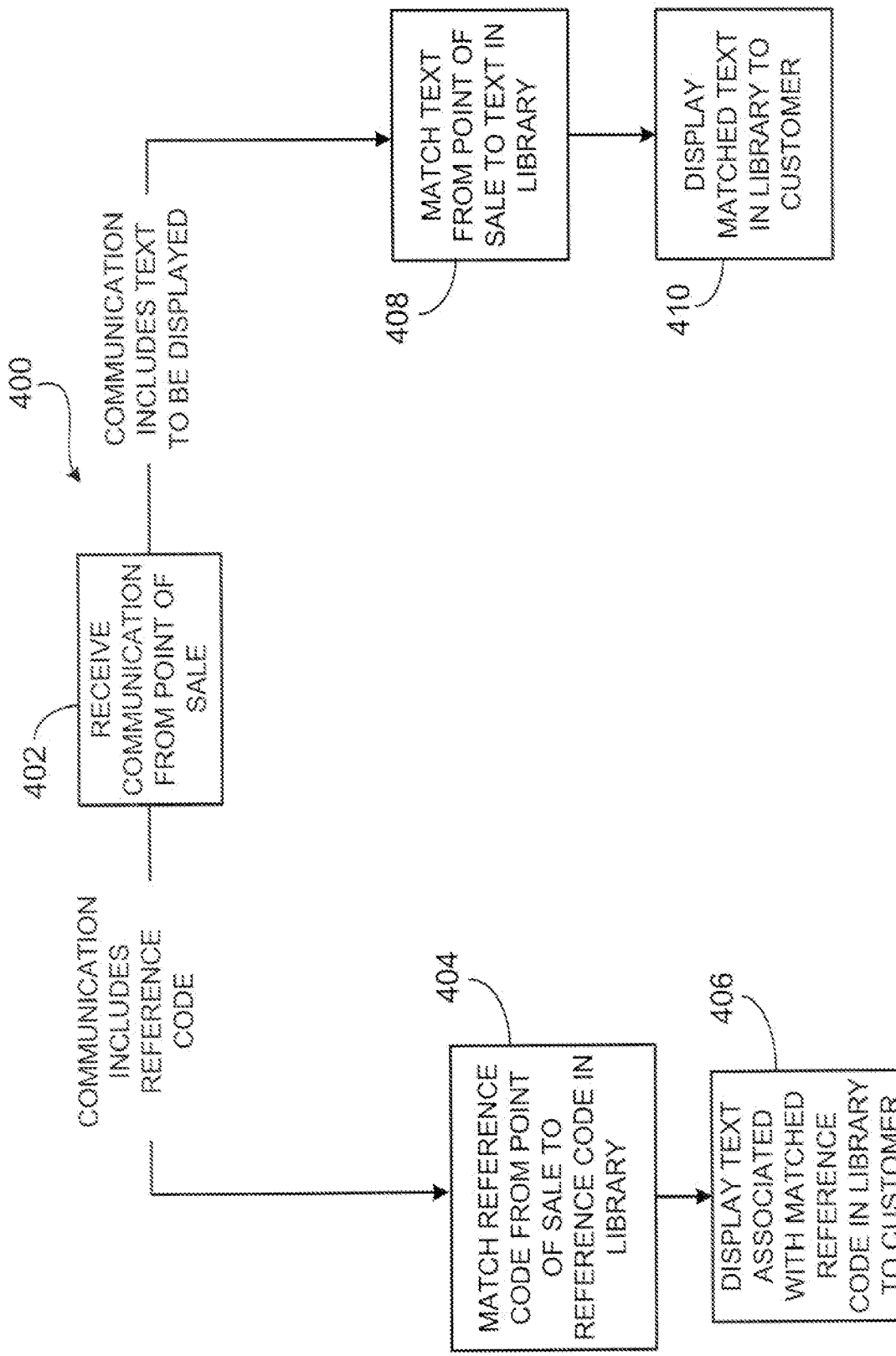
FIG. 4 is a flowchart illustrating one method of confirming communications between a fuel dispenser and an existing retail POS.

FIG. 4 illustrates one method 400 for confirming communications between a fuel dispenser and an existing retail POS. Method 400 may be implemented by a system including a fuel dispenser and a POS terminal, which may be similar to those in fuel dispensing system 100. Method 400 may, for example, illustrate one mode of operation of fuel dispenser 105, including payment module 110 with compatibility module 150, and POS terminal 140.

Method 400 begins when a fuel dispenser payment module receives a communication from a POS terminal [402]. In some aspects, the communication includes a reference code associated with text to be displayed at the fuel dispenser to, for example, a fuel dispenser customer. The text to be displayed may be, for instance, a request for a customer response including encrypted information (e.g., a PIN, a credit card billing address zip code, or a card verification code). The text to be displayed may also include a request for a customer response including unencrypted information. The compatibility module matches the reference code communicated by the POS terminal to an identical reference code in a pre-defined mapping file, or library, stored on, for example, the payment module [404]. The reference code stored in the library has associated text to be displayed. In some aspects of method 400, the associated text to be displayed stored on the payment module is identical to the reference code associated text of the POS terminal. Method 400 contemplates, however, that the associated text to be displayed stored on the payment module may generally describe the reference code associated text of the POS terminal without being exactly identical. Next, the text associated with the matched reference code stored in the library is displayed on, for example, a fuel dispenser customer display [406].

Continuing with method 400, the communication from the POS terminal may include text to be displayed at the fuel dispenser to, for example, the fuel dispenser customer. The compatibility module matches the text to be displayed communicated by the POS terminal to identical text to be displayed in a pre-defined mapping file, or library, stored on, for example, the payment module [408]. Next, the text stored on the library is displayed to the customer on, for instance, a fuel dispenser customer display [410].

FIG. 4 illustrates one method for confirming communications between a fuel dispenser and an existing retail POS, however, other methods may have additional or fewer steps. Also, some steps in method 400 may be done in parallel to other steps. For instance, text to be displayed may be associated with more than one reference code. As an example, several manufacturers of POS terminals may exist, each having its own unique set of reference codes associated with text to he displayed. The payment module may store and associate one particular portion of text to he displayed, e.g., a request for a particular user response, with all reference codes corresponding to that particular request, should the request be common between the POS terminal manufacturers.

A number of implementations have been described, and several others have been mentioned or suggested. Furthermore, those skilled in the art will readily recognize that a variety of additions, deletions, alterations, and substitutions may be made to these implementations while still conducting fuel dispenser transactions. Thus, the scope of protected subject matter should be judged based on the following claims, which may capture one or more aspects of one or more implementations.

What is claimed is:

1. A fuel dispensing system, comprising:
a fuel dispenser configured to communicate with a point-of-sale (POS) device through a communication link to facilitate a user's purchase of fuel, the fuel dispenser including:
a memory having stored therein a plurality of data entries, each of the data entries corresponding to a possible request for information received by the fuel dispenser from the POS device,
a data entry device, and
a processor configured to:
identify a matching one of the plurality of data entries to a request for a user response received by the fuel dispenser from the POS device,
determine a desired user response from the matching one of the plurality of data entries,
prompt the user to provide an input to the data entry device that is indicative of the desired user response,
receive the input, and
cause the input to be transmitted to the POS device in reply to the request for a user response received by the fuel dispenser from the POS device;
wherein each of the data entries stored in the memory has a reference code stored and associated therewith;
the request for the user response received by the fuel dispenser from the POS device includes a reference code; and
the processor identifying the matching one of the plurality of data entries to the request includes matching the reference code included with the request to one of the reference codes stored in the memory and associated with one of the data entries;
wherein the data entry device includes at least a first keypad;
the POS device includes a second keypad configured to allow for user input of alphanumeric data into POS device;
the processor is configured to determine if the input provided to the first keypad is at a same location as the second keypad;
if the location is determined to not be the same, the processor is configured to translate the first keypad location to the second keypad location and is configured to cause the translation to be transmitted to the POS device; and
if the location is determined to be the same, the processor is configured to cause the first keypad location to be transmitted to the POS device.

2. The system of claim 1, wherein the processor is configured to determine whether the request for a user response received by the fuel dispenser from the POS device is requesting a secured response or an unsecured response,
the processor is configured to, in response to a determination that the request for a user response received by the fuel dispenser from the POS device is requesting a secured response, enable a secure mode prior to receiving the input, and
the secure mode is not enabled in response to a determination that the request for a user response received by the fuel dispenser from the POS device is requesting an unsecured response.

3. The system of claim 2, wherein the processor being configured to determine whether the request for a user response received by the fuel dispenser from the POS device is requesting a secured response or an unsecured response includes the processor being configured to determine whether the request for a user response received by the fuel dispenser from the POS device is requesting sensitive user data, a request for sensitive user data being indicative of a request for a secured response and a request not requesting sensitive user data being indicative of a request for an unsecured response.

4. The system of claim 3, wherein the sensitive user data includes at least one of personal user information and financial user information.

5. The system of claim 1, wherein each of the data entries uniquely corresponds to a different possible request for information received by the fuel dispenser from the POS device.

6. The system of claim 1, wherein the data entry device also includes at least one of a card reader and a barcode scanner.

7. The system of claim 1, wherein the fuel dispenser includes a display, and the processor being configured to prompt the user includes the processor being configured to cause a visual display to be provided on the display requesting the user to provide the input.

8. The system of claim 7, wherein the data entry device also includes the display.

9. The system of claim 7, wherein the data entry device also includes at least one of a card reader and a barcode scanner.

10. The system of claim 2, wherein the processor is configured to, in response to determining that the request for a user response received by the fuel dispenser from the POS device is not requesting a secured response or an unsecured response, cause a visual display to be displayed on a display of the fuel dispenser.

11. The system of claim 10, wherein the data entry device also includes at least one of a card reader and a barcode scanner.

12. The system of claim 10, wherein the data entry device also includes the display.

13. The system of claim 2, wherein the processor is configured to, in response to determining that the request for a user response received by the fuel dispenser from the POS device is not requesting a secured response or an unsecured response, generate an error.

14. The system of claim 13, wherein the processor is configured to communicate the error to the POS device using the communication link.

15. The system of claim 14, wherein the communication of the error informs the POS device that the request for a user response received by the fuel dispenser from the POS device was unrecognizable by the fuel dispenser.

16. The system of claim 15, wherein the communication of the error requests the POS device to transmit to the fuel dispenser another request for a user response.

17. The system of claim 2, wherein the processor is configured to, in response to determining that the request for a user response received by the fuel dispenser from the POS device is not requesting a secured response or an unsecured response, either generate an error or cause a visual display to be displayed on a display of the fuel dispenser.

18. The system of claim 1, wherein the POS device is located in a retail fueling environment external to the fuel dispenser or in a commercial fueling environment external to the fuel dispenser.

19. A fuel dispensing system, comprising:
a fuel dispenser configured to communicate with a point-of-sale (POS) device through a communication link to facilitate a user's purchase of fuel, the fuel dispenser including:
   a memory having stored therein a plurality of data entries, each of the data entries corresponding to a possible request for information received by the fuel dispenser from the POS device,
   a data entry device, and
   a processor configured to:
      identify a matching one of the plurality of data entries to a request for a user response received by the fuel dispenser from the POS device,
      determine a desired user response from the matching one of the plurality of data entries,
      prompt the user to provide an input to the data entry device that is indicative of the desired user response,
      receive the input, and
      cause the input to be transmitted to the POS device in reply to the request for a user response received by the fuel dispenser from the POS device;
wherein the POS device is located external to the fuel dispenser, and the communication link is a wireless network communication link such that the fuel dispenser is configured to communicate wirelessly with the POS device;
the processor identifying the matching one of the plurality of data entries to the request includes matching a reference code included with the request to one of a plurality of reference codes associated with one of the data entries;
the data entry device includes at least a first keypad;
the POS device includes a second keypad configured to allow for user input of alphanumeric data into POS device;
the processor is configured to determine if the input provided to the first keypad is at a same location a s the second keypad;
if the location is determined to not he the same, the processor is configured to translate the first keypad location to the second keypad location and is configured to cause the translation to be transmitted to the POS device; and
if the location is determined to be the same, the processor is configured to cause the first keypad location to he transmitted to the POS device.

20. A fuel dispensing system, comprising:
a fuel dispenser configured to communicate with a point-of-sale (POS) device through a communication link to facilitate a user's purchase of fuel, the fuel dispenser including:
   a memory having stored therein a plurality of data entries, each of the data entries corresponding to a possible request for information received by the fuel dispenser from the POS device,
   a data entry device, and
   a processor configured to:
      identify a matching one of the plurality of data entries to a request for a user response received by the fuel dispenser from the POS device,
      determine a desired user response from the matching one of the plurality of data entries,
      prompt the user to provide an input to the data entry device that is indicative of the desired user response,
      receive the input, and
      cause the input to be transmitted to the POS device in reply to the request for a user response received by the fuel dispenser from the POS device;
wherein the fuel dispenser includes a display, and the processor being configured to prompt the user includes the processor being configured to cause a visual display to be provided on the display requesting the user to provide the input;
each of the data entries stored in the memory has text to display stored and associated therewith;
the request for the user response received by the fuel dispenser from the POS device includes text to display on the display of the fuel dispenser;
the processor identifying the matching one of the plurality of data entries to the request includes matching the text to display included with the request to the text stored in the memory and associated with one of the data entries;
the data entry device includes at least a first keypad;
the POS device includes a second keypad configured to allow for user input of alphanumeric data into POS device;
the processor is configured to determine if the input provided to the first keypad is at a same location as the second keypad;
if the location is determined to not he the same, the processor is configured to translate the first keypad location to the second keypad location and is configured to cause the translation to be transmitted to the POS device; and
if the location is determined to he the same, the processor is configured to cause the first keypad location to transmitted to the POS device.

21. The system of claim 19, wherein the data entry device also includes at least one of a card reader, a display and a barcode scanner.

22. The system of claim 20, wherein the data entry device also includes at least one of a card reader a display, and a barcode scanner; and
the POS device is located external to the fuel dispenser.

* * * * *